Figure 6:
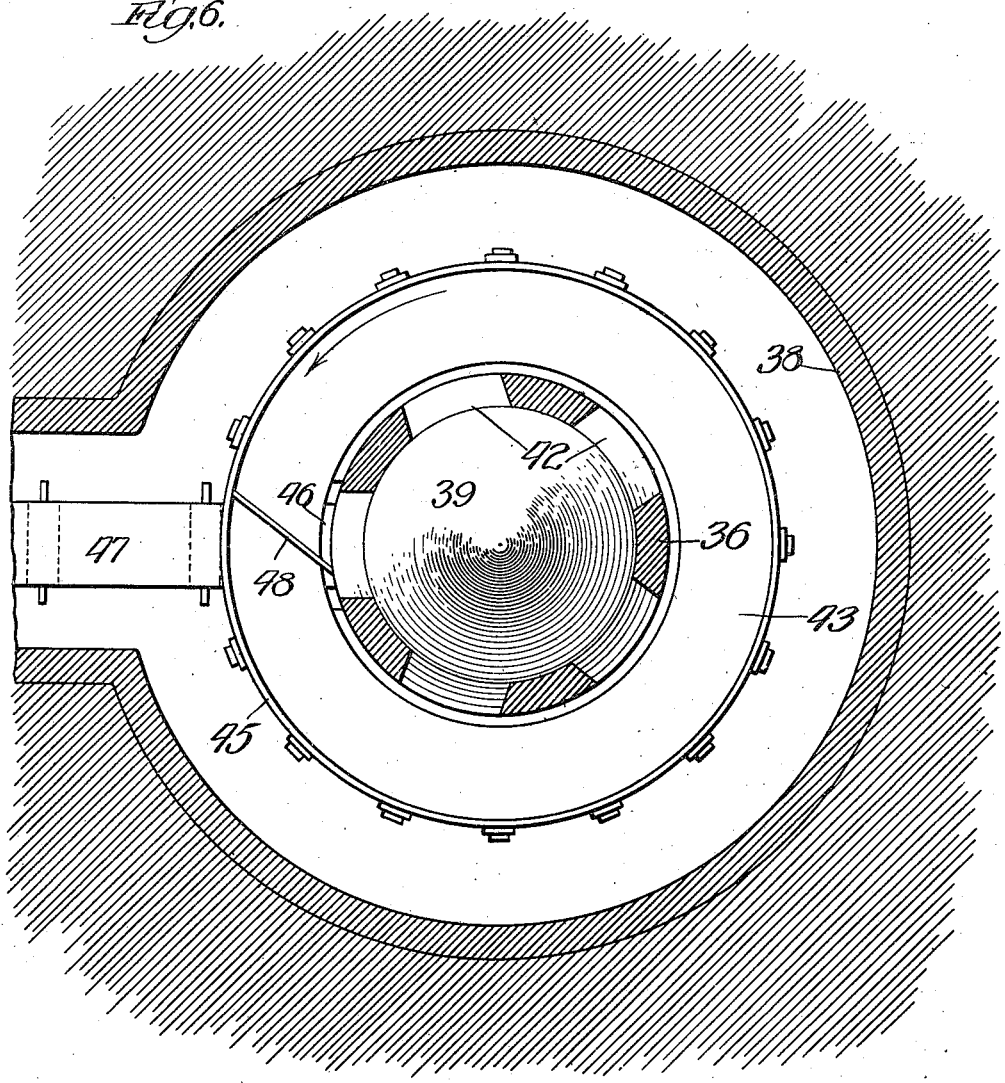

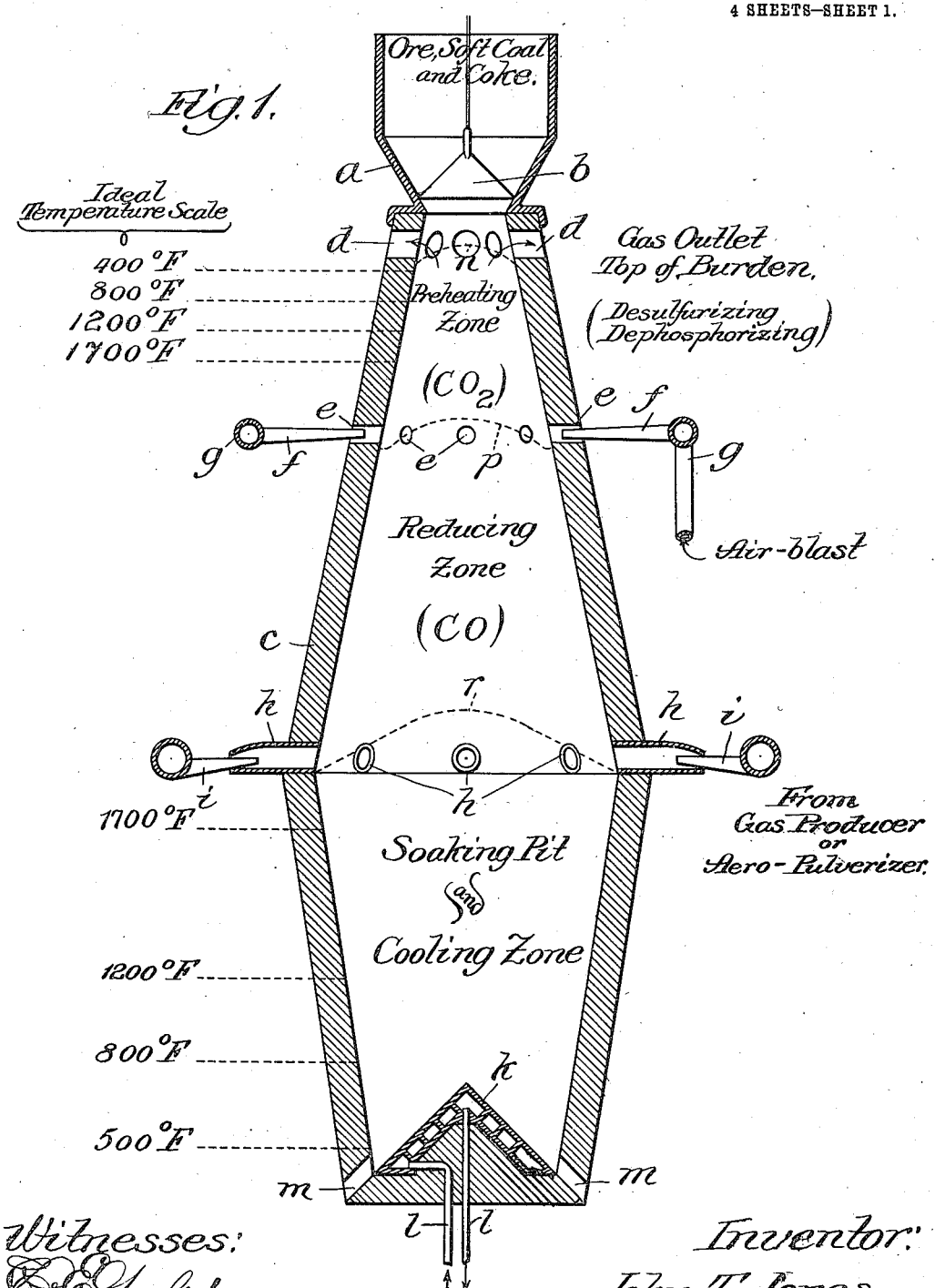

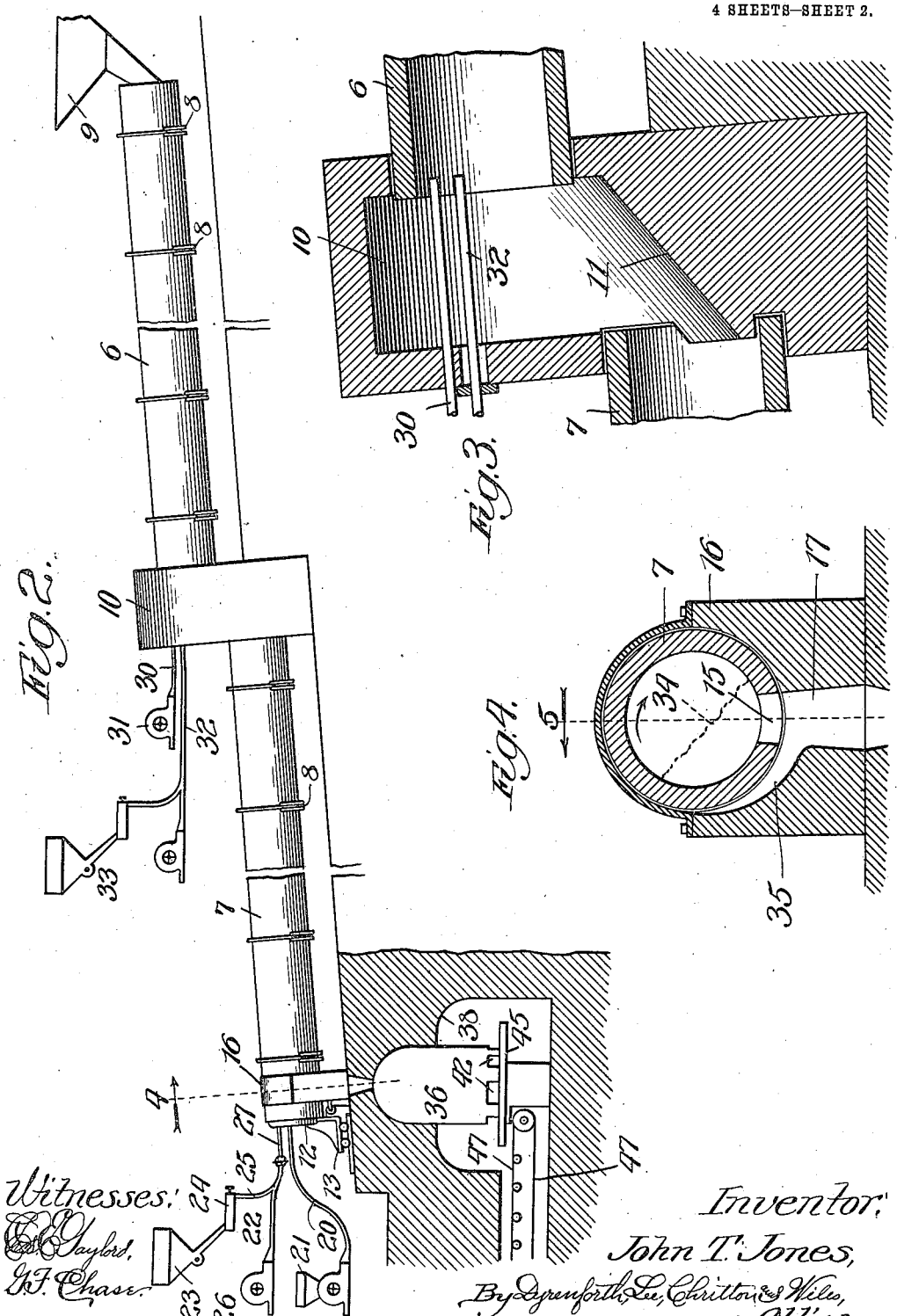

J. T. JONES.
METHOD OF REDUCING IRON ORE.
APPLICATION FILED MAY 12, 1910.
981,280.
Patented Jan. 10, 1911.
4 SHEETS—SHEET 3.
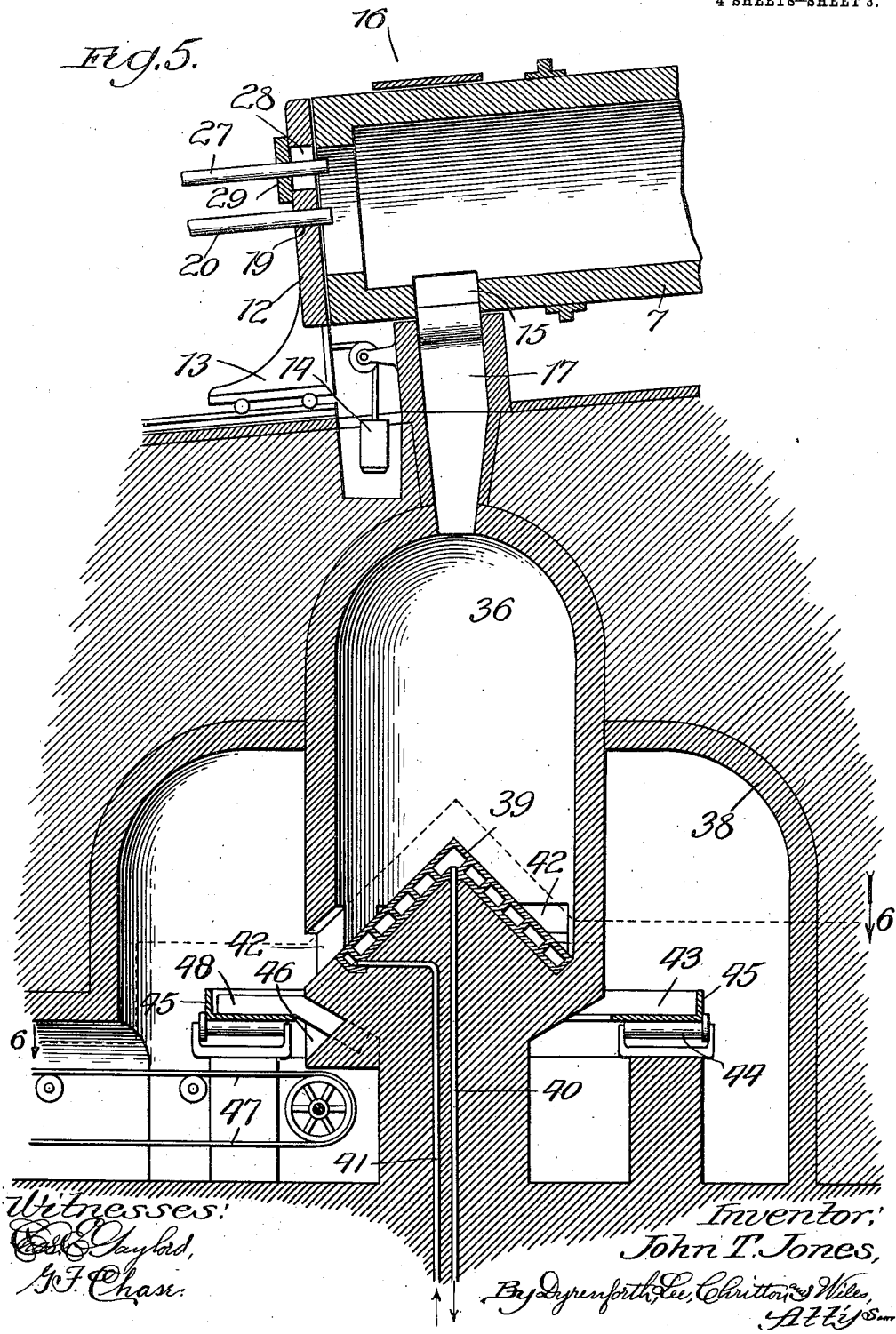

J. T. JONES.
METHOD OF REDUCING IRON ORE.
APPLICATION FILED MAY 12, 1910.

981,280.

Patented Jan. 10, 1911.

4 SHEETS—SHEET 4.

Witnesses:

Inventor:
John T. Jones,
By Dyrenforth, Lee, Chritton & Wiles
Attys

UNITED STATES PATENT OFFICE.

JOHN T. JONES, OF IRON MOUNTAIN, MICHIGAN.

METHOD OF REDUCING IRON ORE.

981,280.

Specification of Letters Patent. Patented Jan. 10, 1911.

Application filed May 12, 1910. Serial No. 560,851.

*To all whom it may concern:*

Be it known that I, JOHN T. JONES, a citizen of the United States, residing at Iron Mountain, in the county of Dickinson and State of Michigan, have invented a new and useful Improvement in the Method of Reducing Iron Ore, of which the following is a specification.

My object is to provide a procedure involving a plurality of steps which in the aggregate, when performed in proper sequence and under controlled conditions for suitable coöperation, accomplish the production from iron ore, in its raw, unconcentrated state, of metallic iron in sponge or other unrefined form, with peculiar economy in the matters of cost of furnace-installation and fuel-consumption, as well as other expenses of operation.

The main steps of my present method include subjecting the ore first to preliminary heating, in the presence of air, then to the action of a hot, reducing atmosphere, and finally to cooling in a non-oxidizing atmosphere; and while these steps are not broadly new and are involved in patents hitherto granted to me, the accompanying, ancillary details of the complete method, as hereinafter explained, contribute toward the accomplishment of my aforesaid object when dealing with ore in large quantity, and toward the obtaining of a uniform output wherein all the iron oxids have been reduced to metallic iron.

My present method may be practiced in a furnace of any suitable type and will be described in detail in connection with the structures illustrated in the accompanying drawings, in which—

Figure 1 is a view, in the nature of a diagram, illustrating, in a general way, a simple form of upright furnace, with notations explanatory of the conditions through which the ore descends in its subjection to the successive steps of the process; Fig. 2, a partly broken, partly sectional and diagrammatic view, in side elevation, illustrating the type of furnace structure which I now prefer to employ, for reasons based upon past experience therewith, in practicing my present improvement; Fig. 3, an enlarged longitudinal section taken at the junction of the preheating and reducing kilns shown in Fig. 2; Fig. 4, an enlarged section taken on line 4 in Fig. 2; Fig. 5, an enlarged longitudinal section taken on line 5 in Fig. 4, at the lower, or discharge, end of the furnace; and Fig. 6, a plan section on irregular line 6—6 in Fig. 5.

In practicing my improved method, and referring to the illustration in Fig. 1, a mixture of iron ore, soft coal and coke (or charcoal) is fed from a hopper $a$ through a bell-valve $b$ into the top of a furnace $c$ having gas-outlets $d$. In the furnace-wall, say, one-quarter to one-third the length of the furnace from its top, are air-inlet openings $e$ preferably equipped with air-supply nozzles, or twyers, $f$ extending from a pipe $g$ which communicates with, say, a hot-air-blast supplier, not shown. In the position indicated are openings, $h$, in the furnace-wall, equipped with means for supplying reducing-gas, which means may consist in nozzles $i$ extending from a gas-producer or aero-pulverizer, supplying hydrocarbon fuel with just enough air, approximately, to support combustion of the fuel on entering the furnace $c$. At the lower end of the furnace structure is a conical water-chamber cooling-plate $k$ equipped with water-circulating pipes $l$; and adjacent to said plate are discharge-outlets $m$ for the product. The lower part of the furnace-chamber, between the plate $k$ and openings $h$, forms a soaking-pit and cooling-zone. The highest temperature which the ore is permitted to reach in the furnace should never equal that necessary to fuse slag-making constituents of the ore, and when discharged into the atmosphere the temperature of the ore should be below that at which the reduced iron will readily reoxidize. I prefer, in practice, therefore, to maintain the temperature as nearly as possible in accordance with the temperature scale indicated in Fig. 1. The discharge from the nozzles $i$ is so controlled as to generate a highly reducing atmosphere maintained, throughout the space between the openings $h$ and $e$, at a temperature approximating, say, 1700° F., which is sufficiently high to effect the desired rapid and thorough reduction of oxid of iron, but will melt none of the slag-making constitutents of the ore. It is to be understood in this connection that I wish to avoid any fusion of the burden contents, which will render any of them fluid or even sticky, thereby preventing any tendency toward their clogging the draft or clinging to the furnace-wall.

The ore fed to the hopper $a$ is preferably, though not necessarily, in finely-divided condition, and in the case of hard ore I prefer to first crush it so that all will pass through a screen of, say, 1 inch mesh. The ore carries, as a rule, a more or less large percentage of sulfur and of phosphorus, neither of which is wanted in the sponge-iron, or the like product, of the furnace, and it is largely for this reason that I feed a comparatively small percentage of soft, preferably bituminous, coal with the ore into the hopper $a$. It is also necessary that the burden shall be non-packing, or interstitial, to permit the ready passage through it of the preheating and reducing gases, and for this and other reasons, hereinafter explained, I mix a comparatively large percentage of coke with the charge. The feed to and discharge from the furnace should be so regulated as to maintain the top of the burden at approximately the level of the dotted line $n$. In the descent of the charge through the space between the lines $n$ and $p$, designated the "preheating zone," the heat of the gases rising thereto from the space between the lines $p$ and $r$, designated the "reducing-zone," and excess air entering through the openings $e$ effect distillation of the bituminous coal and the burning of more or less of the resultant coke and of the coke fed with the charge. In practice, I prefer to control this temperature, by controlling the force and volume of air entering at $e$, so as to maintain a temperature which will heat the ore to approximately 1700° F. ere it passes the plane of the openings $e$. During this preheating operation, which takes place in an oxidizing atmosphere, the sulfur-content of the ore is burned off and more or less completely eliminated, whereby, particularly if the fuel entering at the openings $h$ is sulfur-free, a sponge product free from, or very low in, sulfur is obtained from the furnace. The heating of the charge in the preheating zone is gradual and more or less slow, whereby the volatile products of decomposition of the fresh fuel, which have great affinity for phosphoric acid, will tend, in a large measure at least, to collect and carry off the phosphor-content of the ore before the conditions reach those necessary to bind phosphorus to the metal.

The preheated charge enters the reducing-zone at approximately the temperature of the latter, say, 1700° F., and remains in the reducing atmosphere for a prolonged period of time, whereby on reaching the level $r$ all or nearly all the iron oxids will have changed to metal and the ore to a sponge, or the like unrefined, condition. The upper portion of the space below the openings $h$ acts as a soaking-pit in which the ore slowly loses its temperature in a reducing atmosphere, and where any metallic oxids that may still remain in the ore will be reduced.

I have found it to be a matter of great difficulty in practice to prevent access of air to the furnace below the reducing zone, and naturally if the reduced ore at a high temperature comes under the influence of air it is quickly reoxidized. I may state that it is next to impossible in a practical way to prevent air from entering the lower end of the furnace-structure while ore is being discharged therefrom, and the entrance of air will also take place at different points below the preheating-zone if valved openings are provided in the furnace-wall, as is often necessary, or at least desirable, for the purpose of taking temperatures or of inspecting the progress of the operations within the furnace. The excess of coke which, as before stated, serves the purpose of rendering the burden interstitial, and incidentally aids materially in reduction of the metallic oxids, serves, furthermore, to rob any incoming air of its oxygen, and thus protects the metal against any reoxidizing influence until the charge is cooled below the temperature at which the metal-contents will readily reoxidize.

If the ore treated in the furnace is of high grade and the resultant sponge iron, or the like, contains a comparatively small percentage of slag-making ingredients, a large percentage of the coke may be screened or otherwise separated and saved from the reduced mass and the latter charged directly into a balling or other furnace to be treated for the production of merchantable iron. My method, however, is well adapted for the economical reduction of the lower grades of iron ore, in which event I prefer to first screen off the lump-coke, then crush the mass, then subject it to magnetic separation or jigging, saving the metallic iron in a comparatively pure state for the further treatment. Comparatively little fuel is required in carrying on the operations described, and the coke may be used over again by being charged, as described, with a comparatively small percentage of fresh hydrocarbon fuel into the hopper $a$. The gas discharged through the outlet $d$ may be used, if desired, to heat the air-blast, or for other useful purposes.

As I have carried on my work to its present stage of commercially practicable perfection in a furnace of the rotary-kiln type, in which the various accessories and adjustments requisite for temperature and other control have been determined by me, I prefer at present to use that type of furnace, in the practice of my invention, constructed substantially as illustrated in Figs. 2 to 6 of the accompanying drawings.

6 and 7 are, respectively, upper, or preheating, and lower, or reducing, furnace-members, each in the form of an inclined cylindrical kiln, supported upon rollers 8 and equipped with means (not shown) for rotating them on their axes. Extending into the upper end of the kiln 6 is a charging-hopper 9, and the lower end of said kiln rotates in a stationary, chambered structure 10. The kiln 7 rotates at its upper end in the lower part of the chambered structure, which latter has an inclined floor 11 forming a chute to direct material discharged from the kiln 6 into the kiln 7. The latter at its lower end rotates against a yielding, stationary door 12 mounted upon a trunk 13 and held normally closed by weights 14, as indicated. A short distance above the lower end of the kiln 7, in one side, is an ore-discharge opening 15, at which point the said kiln passes through and is surrounded by a stationary hood-structure 16 having an ore-discharge passage 17. Passing through an opening 19 in the door 12 is a pipe 20 extending from an aero-pulverizer 21. The device 21 pulverizes bituminous coal fed thereto and discharges it, with air to support combustion, through the pipe 20.

22 is a lump-coal introducing device having a hopper 23 which is charged with bituminous coal in lumps approximating, say, ¼-inch to 1-inch mesh, which is discharged by means of an ordinary worm-feed, or other suitable feeding means, 24 into a pipe 25, to which also leads a pipe from a blower or air-blast generator, 26. The pipe 25 has a pivoted nozzle 27 passing through a comparatively large opening 28 in the door 12. The nozzle carries a sliding plate, or valve, 29 covering the opening 28 while permitting adjustment of the nozzle 27 to different angles in the vertical plane.

The construction involving the aero-pulverizer 21 and means for discharging lump-coal through the lower end of the kiln, above described, forms the subject-matter of a separate concurrent application, filed by Elmer W. Jones April 8, 1909, Serial No. 488,712.

Coal-dust discharged through the pipe 20 is ignited, sufficient air being supplied with the coal to support rapid and approximately complete combustion, for the purpose of creating a controlled, highly-heated and preferably neutral, or deoxidizing, atmosphere, which fills the kiln 7. The lump-coal may be directed at different angles into the furnace by adjustment of the nozzle 27, whereby it may be projected a desired distance, from the lower end, into the kiln to be distilled by the heat and produce a highly-reducing atmosphere from the opening 15 upward throughout the kiln 7. Extending through the chamber 10 into the lower end of the kiln 6 is a pipe 30 from an air-blast generator, or blower, 31. Extending parallel with the pipe 30 into the lower end of the kiln 6 is a pipe 32 leading from a lump-coal injecting device 33 operating, like the device 22 described, to discharge lump bituminous coal, with air, through the lower end of the kiln 6. The excess of air provided by the blower 31 renders the atmosphere in the kiln 6 oxidizing in its nature.

By suitably adjusting the aero-pulverizer, lump-coal feeders and air-blast supplier the heat in the kilns, and the oxidizing and deoxidizing natures of the atmospheres therein, may be controlled within narrow limits. I find it very desirable in practice, in the present instance, to maintain the kiln 7, between the discharge opening 15 and the chamber 10, at a temperature approximating 1700° F., and the lower, approximately one-third, of the kiln 6 at about the same temperature.

In operating the furnace I mix the iron ore to be reduced with carbonaceous material, preferably coke, the coke equaling or exceeding in quantity the iron ore with which it is mixed. This mixture is charged into the hopper 9 and fed regularly or intermittently into the upper end of the kiln 6. The feed may be so regulated as to maintain the furnace throughout, say, one-third full; that is to say, the material as it is advanced by the rotation of the kilns fills the same to approximately the level indicated by the dotted line 34 in Fig. 3. As the mixture is advanced along the kiln 6 it is constantly stirred and turned over by the rotation of the kiln, so that all parts thereof are exposed to the heat. The heat absorbed by the mixture naturally lowers the temperature in the upper part of the kiln 6 which, in practice, is thus reduced to approximately 400° F. The mixture therefore moves along through a gradually-increasing temperature which, by the time the mixture reaches the chamber 6, has raised the same to approximately 1700° F. In the movement of the mixture through the kiln 6 the fresh coal from the injector 33 will be distilled and part of the coke will be consumed, the temperature thus given off being taken into consideration, but most of the coke will be still unconsumed on reaching the chamber 10 and upper end of the kiln 7. It will be understood that any sulfur-contents of the mixture will be burned off in its passage through the kiln 6. While in the description in connection with Fig. 1 I stated that the fresh fuel is there fed with the ore and coke from the hopper $a$ for the purpose explained, in the present case the coal is fed by the injector to be deposited in the position, anywhere between the ends of the kiln 6, where it is desired that distillation of the fuel shall commence. This may be, for example, at the point, or approximate point, where the ore reaches a temperature at which its phosphorus will be most readily collected and carried off by the volatile products of decomposition of the fresh fuel. On reaching the upper end of the kiln 7 the mixture enters a highly-reducing atmosphere the reducing nature of which is enhanced by the incandescent coke in the ore-mixture. As the mixture moves slowly downward from the chamber 10 to the outlet 15 (a distance, in practice, of about 100 feet) it is subjected for a prolonged time under a temperature approximating, say, 1700° F. to the reducing action of the deoxidizing atmosphere, whereby the iron oxids are changed to metallic iron. Thus, on reaching the discharge-opening 15 the mixture will consist of metallic iron, slag-making constituents and a large remaining percentage of unconsumed coke.

The hood structure 16 is provided to prevent, as far as possible, access of air to the kiln through the intermittent-discharge opening 15 as the kiln is turned. To prevent the crowding of ore-mixture between the kiln and hood-structure adjacent to the opening 15, the ore-discharge passage 17 is enlarged, at one side, as shown at 35. The point at which the lump-coal is deposited from the nozzle 27 should, preferably, be well beyond the opening 15 to give time for thorough distillation before its discharge from the kiln 7.

In Figs. 2, 5 and 6 I show a soaking-pit 36 of special construction, the equivalent in effect of the soaking pit and cooling zone in Fig. 1, and into which the reduced mixture falls as it is discharged through the opening 17. The pit, or chamber, 36 is dome-shaped and its lower part is surrounded by a chamber 38. The base of the chamber 36 is conical and covered by a conical water-jacket casting 39 to which water is fed through a pipe 40 and from which water is discharged through a pipe 41. Around the lower part of the pit below the top of the cone 39 is an annular series of discharge-openings 42, and surrounding the pit in the chamber 38 is a circular carrier 43 supported on rollers 44 and provided with means, not shown, for moving it continually in the direction of the arrow in Fig. 5. The carrier is surrounded by a flange 45. At the point 46 below the plane of the openings 42 is a discharge chute leading from the inner side of the carrier to a traveling belt conveyer 47. Extending across the carrier to the flange thereof at one side of the chute 46 is a scraper 48. In practice, the discharge of ore from the carrier 43 through the chute 46 to the carrier 47 should equal the discharge from the furnace into the pit, whereby the latter may be maintained approximately full at all times. The openings are filled with the reduced material, which tends to prevent access of more air to the soaking-pit than the hot cake will absorb, so that as the mass descends and is gradually cooled, owing to the influence of the water-cooled plate 39, it will remain in a reducing atmosphere which will complete the reduction of any iron oxids that may be, by any chance, discharged from the kiln 7. In practice, while the reduced material as it enters the top of the soaking-pit will have a temperature of, say, 1700° F., this temperature will be reduced to 500° F., or lower, where the material passes to the conveyer, at which latter temperature it does not readily reoxidize. I prefer that the mass being treated, as described, shall not be raised above a temperature of approximately 1700° F., at any step in the process, which temperature is safely below that necessary to render fluid, or at all sticky, any of the slag-making constituents of the ore. This results in great economy in fuel consumption, as the coke, when separated from the mass after its discharge from the soaking-pit, may be used over again, as before stated. The prolonged subjection of the metallized iron in the lower part of the kiln 7 and upper portion of the soaking-pit, in a highly heated condition, to the influence of the highly heated coke, effects a process of cementation, wherein a small percentage of carbon is absorbed by the iron, and raises, to a more or less slight extent, the fixed carbon content of the metal, depending upon the length of time the necessary temperature is maintained. This fixed carbon acts as a protector against oxidation of the metal, when, for example, the further treatment thereof is in a balling furnace, and is necessary in the event of conversion of the iron to steel. It is an easy matter in the construction shown to regulate the time during which cementation will take place in the soaking pit, by regulating the rapidity of discharge onto the carrier 43 with reference to the feed into the top of the pit.

While I prefer to employ the apparatus shown and described in carrying out the steps of my improved method, the said apparatus may, of course, be variously modified without departing from the spirit of my invention as defined by the claims.

What I regard as new and desire to secure by Letters Patent is—

1. The herein-described treatment of ore, to reduce its metallic-oxid content to metal, which consists in mixing with the ore fresh hydrocarbon fuel and passing the mixed mass through a highly-heated oxidizing atmosphere to preheat the ore, distil the fresh fuel and burn off any sulfur-content of the ore, and then passing the preheated mass through a hot deoxidizing atmosphere to reduce the metallic oxids to metal without rendering fluid any metallic or slag-making constituents of the mass.

2. The herein-described treatment of ore, to reduce its metallic-oxid content to metal, which consists in mixing with the ore coke, in lump form, and fresh hydrocarbon fuel and passing the mixed mass through a highly-heated oxidizing atmosphere to preheat the ore, distil the fresh fuel and burn off any sulfur-content of the ore, and then passing the preheated mass through a hot deoxidizing atmosphere to reduce the metallic oxids to metal without rendering fluid any metallic or slag-making constituents of the mass.

3. The herein-described treatment of ore, to reduce its metallic-oxid content to metal, which consists in mixing with the ore coke, in lump form, heating the said mixture, then mixing therewith fresh hydrocarbon fuel, thereupon passing the mixed mass through a highly-heated oxidizing atmosphere to preheat the ore, distil the fresh fuel and burn off any sulfur-content of the ore, and then passing the preheated mass through a hot deoxidizing atmosphere to reduce the metallic oxids to metal without rendering fluid any metallic or slag-making constituents of the mass.

4. The herein-described treatment of ore, to reduce its metallic-oxid content to metal, which consists in mixing with the ore coke, in lump form, and fresh hydrocarbon fuel, passing the mixed mass through a highly-heated oxidizing atmosphere to preheat the ore, distil the fresh fuel and burn off any sulfur-content of the ore, then passing the preheated mass through a hot deoxidizing atmosphere to reduce the metallic oxids to metal without rendering fluid any metallic or slag-making constituents of the mass, and subjecting the hot reduced ore in the presence of the remaining coke in the mass to soaking and cooling under confinement in a non-oxidizing atmosphere.

5. The method of reducing iron oxids in ore to metallic iron, which consists in mixing with the ore coke, in lump form, and fresh hydrocarbon fuel, passing the mixed mass through a controlled oxidizing atmosphere of increasing temperature, to distil the fresh fuel and burn off any sulfur-content of the ore and preheat the ore to a degree nearing, without reaching, the fusing point of any of its slag-making constituents, consuming part only of the carbonaceous material in the mixture to aid in obtaining said temperature, then passing the preheated ore and unconsumed coke through a deoxidizing atmosphere at a temperature that will reduce the iron oxids to metallic iron without rendering the slag-making constituents fluid, and causing the highly-heated unconsumed coke to shield the reduced iron against reoxidation during any change in the atmosphere from a deoxidizing to a reoxidizing condition.

JOHN T. JONES.

In presence of—
CHAS. E. GAYLORD,
RALPH A. SCHAEFER.